Jan. 20, 1925.
1,523,678
J. H. WHEELER ET AL
CHEESE TREATING APPARATUS
Filed Feb. 29, 1924
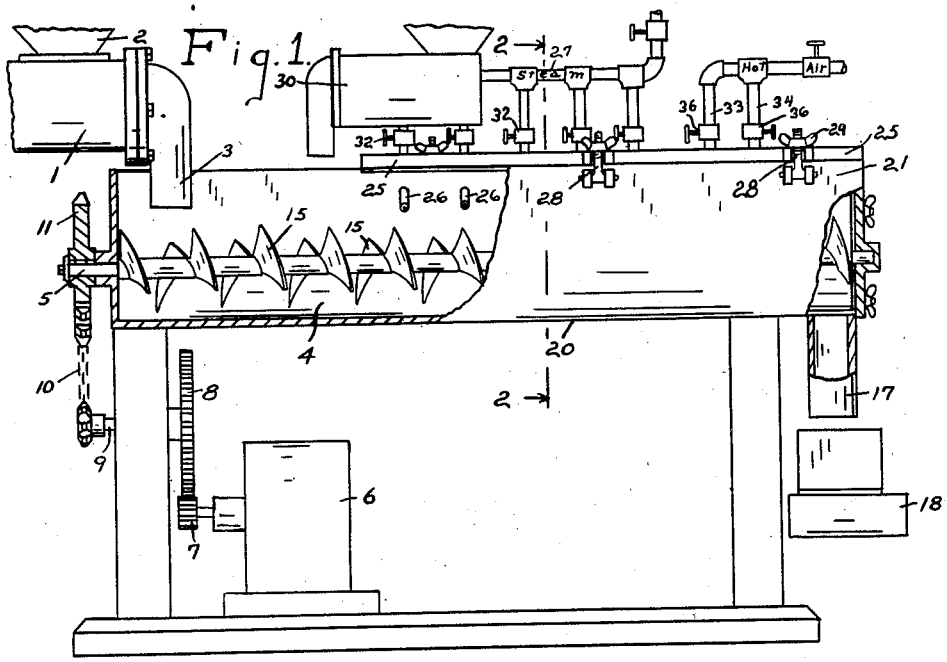
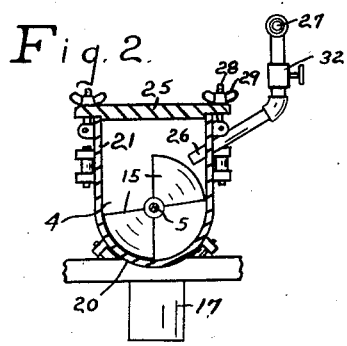
John H. Wheeler
J H. Murray Scott
INVENTORS
BY
Erwin, Wheeler & Wodard
ATTORNEYS Patented Jan. 20, 1925.

1,523,678

UNITED STATES PATENT OFFICE.

JOHN H. WHEELER, OF PLYMOUTH, AND HENRY MURRAY SCOTT, OF WALDO, WISCONSIN.

CHEESE-TREATING APPARATUS.

Application filed February 29, 1924. Serial No. 695,959.

*To all whom it may concern:*

Be it known that we, JOHN H. WHEELER and HENRY MURRAY SCOTT, citizens of the United States, residing at Plymouth and Waldo, respectively, county of Sheboygan, and State of Wisconsin, have invented new and useful Improvements in Cheese-Treating Apparatus, of which the following is a specification.

Our invention relates to improvements in devices for heat treating cheese, and pertains especially to devices for carrying out the process set forth and described in a companion application Serial #664,382, filed September 24, 1923.

The objects of this invention are to provide means whereby the temperature of the cheese may be rapidly, uniformly and progressively raised to the desired degree without danger of overheating any portion of it; to provide means whereby the cheese may be comminuted and kept in a comminuted condition while it is being subjected to the direct action of a heated fluid to heat it to the desired temperature; to provide simple and effective apparatus for continuously handling comminuted cheese and subjecting it to the action of a heated fluid with minimum expenditure of power and without danger of clogging the passageway along which the cheese travels; and to provide apparatus which will produce a better flavored and more homogeneous product than any heretofore made.

In the drawings:

Figure 1 is a side elevation, partly in longitudinal section, of a cheese treating machine embodying our invention.

Figure 2 is a transverse sectional view on line 2—2 of Figure 1.

Like parts are identified by the same reference characters throughout the several views.

An ordinary shredding or comminuting device 1, commonly termed a grinder, receives the cheese through a hopper 2 and delivers it through a spout 3 into a conveyor trough 4 in which an agitating conveyor is mounted. The conveyor shaft 5 extends longitudinally of the trough and is preferably rotated by a motor 6 which drives the conveyor shaft 5 through the pinion 7, gear wheel 8, shaft 9, and sprocket chain 10,—the latter operating over a sprocket wheel 11 at the front end of the conveyor shaft 5.

The conveyor shaft is provided with pitched or helically shaped paddles 15 constituting segments of an imaginary helical screw thread. The shaft is rotated in a direction to cause these paddles or conveyor segments 15 to push longitudinally of the trough 4 toward the downwardly extending outlet spout 17 through which the cheese passes into receptacles which, if desired, may be carried underneath the spout by a cross conveyor 18.

The bottom 20 of the trough 4 is cylindrically curved. The sides 21 extend upwardly, preferably to a substantial distance above the conveyor without converging. It is not essential to out invention whether these sides are vertical and parallel, or whether they diverge. In Figure 2 they are shown as vertical and parallel and this form is preferred.

A lid 25 covers the rear portion of the trough and heated steam is injected underneath this lid through pipes 26 which may be conveniently connected with a main 27. The lid 25 is detachable. It may be conveniently clamped in position on the upper margins of the trough 4 by bolts 28 and nuts 29.

When it is desired to flavor the cheese, the flavoring material may be fed into the open end portion of the trough from a feeding container 30 of any ordinary type. The cheese not being confined in the trough, it is possible to feed the same rearwardly in the described manner without repacking or massing it. Therefore, the flavoring material readily penetrates and mingles with the cheese fragments and becomes thoroughly mixed by the action of the segmental blades or paddles which alternately catch and let go as they push the cheese longitudinally of the trough. For the same reason, the steam readily and rapidly mixes with the cheese fragments which are constantly being lifted from the bottom of the trough and presented to the action of the steam in the space between the conveyor or between the cheese conveyed thereby and the lid 25.

We find that with a conveyor and conveyor trough, constructed as described, steam may be injected at a temperature of approximately 300° F. and a pressure of about 90 to 100 pounds without any noticeable quantity of steam passing into the atmosphere from either end of the trough. The space between the cheese and the lid is open, and therefore there will be no substantial or material pressure upon the cheese. In fact, it is possible to ascertain in this manner whether an excess quantity of steam is being delivered or whether the temperature of the cheese is being unduly raised,—for the reason that an excess quantity of steam will be manifest by the escape of steam from underneath the lid in the direction of the front end of the machine and an excess temperature in the cheese will have a similar effect by causing the cheese to melt down unduly, thereby reducing its steam absorbing capacity. Valves 32 are, therefore, provided to control the flow of steam through the pipes 26. By adjusting these valves, the flow of steam through some of the pipes may be cut off or, if desired, may be partially cut off in each of the pipes until the maximum amount of steam is delivered which the cheese is capable of absorbing. With a trough about 10 feet long and covered by the lid 25 for about two-thirds its length, we are enabled to continuously deliver cheese through the spout 17 at a temperature of about 160° F., at which temperature the cheese is in a semi-liquid or plastic condition suitable for repacking. It will of course be understood that with the described construction and mode of operation of the apparatus, this temperature will not be attained until the cheese is about to reach the discharge end of spout 17, the rise of temperature being substantially uniform in all portions of the cheese from the time the cheese passes to the time it reaches the spout 17.

The structural features above described are sufficient for the treatment of ordinary American cheese in the ordinary way. But for some varieties or grades of cheese and in cases where flavoring materials, such as pimento, are added, the initial moisture content of the cheese may be such that the escape of steam from underneath the lid will not be a sufficient criterion from which to determine the proper degree of saturation. Also, it may not be possible to raise the temperature of the cheese to the proper point without using steam in such quantity as to raise the moisture content of the cheese beyond the desired point of degree of saturation.

For the above reasons we have added one or more pipes 33 and 34 similar to the pipes 26 but connected with a source of hot air supply under pressure, whereby hot air may be injected through these pipes to absorb surplus moisture, when occasion so requires.

The hot air will of course have a temperature of about 160° F. or a little above that temperature whereby the temperature of the cheese may be maintained at about the point to which it has been raised by the steam. The injection of the hot air is controlled by valves 36.

We claim:

1. Cheese treating apparatus comprising the combination of an open trough, a lid covering the rear portion of said trough, means for feeding comminuted cheese into the front end of the trough, an agitating conveyor adapted to progressively feed the cheese toward the rear end of the trough, and means for subjecting the cheese to the direct action of a heated fluid in the open space between the cheese and the lid during a portion of its passage to the rear end of the trough, said space being open to the atmosphere to allow observation and prevent the development of pressure upon the cheese.

2. Cheese treating apparatus comprising an open trough, a longitudinally extending agitating conveyor mounted therein, means for feeding comminuted cheese to the receiving end of said conveyor, a detachable cover for a portion of the trough, and means for injecting steam into the covered portion of the trough between the conveyor and said cover.

3. Cheese treating apparatus comprising the combination of a trough having a rounded bottom and upwardly extending sides, of a conveyor in said trough having helically pitched paddles revoluble about a longitudinal axis, a motor for actuating the conveyor means for feeding comminuted cheese to the receiving end of the conveyor, a detachable lid for a portion of the trough, and controlled means for injecting steam into the space underneath the lid at a plurality of points along one side of the trough, said trough having an outlet spout through which the cheese is delivered by the conveyor.

4. Cheese treating apparatus comprising an open trough, a longitudinally extending agitating conveyor mounted therein, means for feeding comminuted cheese to the receiving end of said conveyor, a detachable cover for a portion of the trough, means for injecting steam into the covered portion of the trough between the conveyor and said cover, and valve controlled means for injecting hot air into the covered portion of the trough between the steam injecting means and the discharge end.

5. Cheese treating apparatus comprising the combination with a covered passage, open to atmospheric pressure, of valve controlled means for feeding steam into said passage and a conveyor adapted to deliver comminuted cheese along said passage in a manner to successively present the fragments to the direct action of the incoming steam.

6. Cheese treating apparatus comprising the combination of a cheese conveyor, open at the top in one portion and closed in another portion, means for feeding comminuted cheese thereto, valve controlled means for delivering heated steam to the upper surface of the cheese within the covered portion and allowing it to freely pass to the uncovered portion while it is being advanced by said conveyor, and valve control means for subsequent delivery of hot air to the cheese to remove excess moisture.

JOHN H. WHEELER.
H. MURRAY SCOTT.